US010774582B2

(12) United States Patent
Chen

(10) Patent No.: US 10,774,582 B2
(45) Date of Patent: Sep. 15, 2020

(54) RESISTANCE ADJUSTING DEVICE FOR NON-PULL CORD WINDOW BLIND

(71) Applicant: Po-Yu Chen, Taichung (TW)

(72) Inventor: Po-Yu Chen, Taichung (TW)

( * ) Notice: Subject to any disclaimer, the term of this patent is extended or adjusted under 35 U.S.C. 154(b) by 223 days.

(21) Appl. No.: 15/892,761

(22) Filed: Feb. 9, 2018

(65) Prior Publication Data

US 2019/0162018 A1 May 30, 2019

(30) Foreign Application Priority Data

Nov. 28, 2017 (TW) .............................. 106141419 A

(51) Int. Cl.
*E06B 9/322* (2006.01)
*F16H 19/06* (2006.01)

(52) U.S. Cl.
CPC ......... *E06B 9/322* (2013.01); *F16H 19/0672* (2013.01); *E06B 2009/3222* (2013.01)

(58) Field of Classification Search
CPC ............. E06B 9/322; E06B 2009/3222; E06B 2009/3225; E06B 9/324; E06B 9/38; E06B 9/26; E06B 9/30; E06B 9/32; E06B 9/307; Y10T 24/2187; Y10S 24/909; F16H 19/0672; A47H 3/00; A47H 3/02; A47H 3/08; G05G 1/08
USPC .......................... 242/396, 396.1; 74/526, 527
See application file for complete search history.

(56) References Cited

U.S. PATENT DOCUMENTS

| | | | | |
|---|---|---|---|---|
| 3,564,929 A * | 2/1971 | Halstead | ................... | H03J 1/06 74/10.2 |
| 8,087,445 B2 * | 1/2012 | DeWard | .................. | E06B 9/322 160/170 |
| 9,372,497 B2 * | 6/2016 | Wall | ......................... | G05G 1/08 |
| 2003/0192653 A1 * | 10/2003 | Nien | ...................... | E06B 9/322 160/168.1 R |
| 2016/0032645 A1 * | 2/2016 | Wen | ......................... | E06B 9/324 160/178.2 |
| 2018/0119490 A1 * | 5/2018 | Chen | ....................... | E06B 9/322 |
| 2019/0316412 A1 * | 10/2019 | Lei | ........................... | E06B 9/322 |
| 2019/0323288 A1 * | 10/2019 | Chen | ....................... | E06B 9/322 |

* cited by examiner

*Primary Examiner* — Katherine W Mitchell
*Assistant Examiner* — Jeremy C Ramsey
(74) *Attorney, Agent, or Firm* — Rosenberg, Klein & Lee

(57) ABSTRACT

A resistance adjusting device for a non-pull cord window blind includes a base having a first positioning portion and a fixed shaft, a resistance adjusting seat sleeved onto the fixed shaft of the base by a transmission shaft, and a control pin sleeved onto the fixed shaft of the base by a driving shaft having a second positioning portion and a driving portion. When the second positioning portion is engaged with the first positioning portion, the control pin can't rotate, and the resistance of the lift transmission cord can't be adjusted. When the second positioning portion is separated from the first positioning portion and the driving portion of the driving shaft of the control pin is engaged with the transmission shaft of the resistance adjusting seat, the control pin can drive the resistance adjusting seat to adjust the resistance of the lift transmission cord.

11 Claims, 12 Drawing Sheets

RESISTANCE ADJUSTING DEVICE FOR NON-PULL CORD WINDOW BLIND

BACKGROUND OF THE INVENTION

1. Field of the Invention

The present invention relates to non-pull cord window blinds and more particularly, to a resistance adjusting device for the non-pull cord window blind.

2. Description of the Related Art

As to the general non-pull cord window blind, when the bottom beam is pulled downwardly, the lift transmission cord attached to the slats is pulled out by the bottom beam so as to escape from the cord rolling device gradually, until the slats are completely unfolded. In opposite, when the bottom beam is pushed upwardly, the upward pushing force applied to the bottom beam counteracts the weight of the bottom beam and all the slats, enabling the cord rolling device to roll up the lift transmission cord successfully, so that the slats can be folded up stably. However, no matter the bottom beam is in the process of being pulled downwardly or pushed upwardly by an external force, once the external force is relieved, the slats will not be easily fallen down or folded up, but able to be stopped at any height at any time because of the appropriate resistance provided by a resistance device of the cord rolling device to the lift transmission cord.

For adapting to different usage requirements, the resistance provided by the resistance device to the lift transmission cord sometimes needs to be adjusted. However, in the aforesaid prior art, the user has to disassemble the whole cord rolling device before adjusts the resistance device and assemble the cord rolling device after the adjustment, that is very inconvenient in operation. Besides, many times of disassembly and assembly may affect the assembly accuracy of the inner members of the cord rolling device.

SUMMARY OF THE INVENTION

It is a primary objective of the present invention to provide a resistance adjusting device for the non-pull cord window blind, which is convenient in operation and needs no structural disassembly and assembly.

To attain the above objective, the present invention provides a resistance adjusting device which includes a base, a resistance adjusting seat, and a control pin. The base has a top hole, a first positioning portion, and a fixed shaft having circular cross-sections. The resistance adjusting seat is disposed on the base, and has a transmission shaft and a plurality of resistance adjusting rods. The transmission shaft has a transmission hole which is polygon-shaped in cross-sections. The resistance adjusting seat is rotatably sleeved onto the fixed shaft of the base by the transmission hole of the transmission shaft. The plurality of resistance adjusting rods are disposed around the transmission shaft for supporting and pushing a lift transmission cord. The control pin has a driving shaft. The control pin is sleeved onto the fixed shaft of the base by the driving shaft in a way that the control pin is displaceable vertically and rotatable. Besides, the driving shaft has a second positioning portion and a driving portion which is polygon-shaped in cross-sections.

In this way, when the control pin is located at a positioning position, the second positioning portion of the driving shaft of the control pin is engaged with the first positioning portion of the base to disable the control pin from driving the resistance adjusting seat to rotate. At this time, the friction resistance between the lift transmission cord and the resistance adjusting seat is unable to be adjusted. When the control pin is pulled by an external force to move up to an adjustment position, the second positioning portion of the driving shaft of the control pin is separated from the first positioning portion of the base, and the driving portion of the driving shaft of the control pin is engaged with the transmission hole of the transmission shaft of the resistance adjusting seat to enable the control pin to drive the resistance adjusting seat to rotate together. At this time, during the rotation of the resistance adjusting seat, the cord arrangement of the lift transmission cord is changed by one or a plurality of the resistance adjusting rods, so that the resistance can be adjusted.

It can be understood from the above illustration that the resistance adjusting device can be used to adjust the friction resistance between the lift transmission cord and the resistance adjusting seat as long as the control pin is operated to the adjustment position. The whole process needs no structural disassembly and assembly, thereby increasing the usage convenience and maintaining good assembly accuracy.

DETAILED DESCRIPTION OF THE INVENTION

Figure 1:
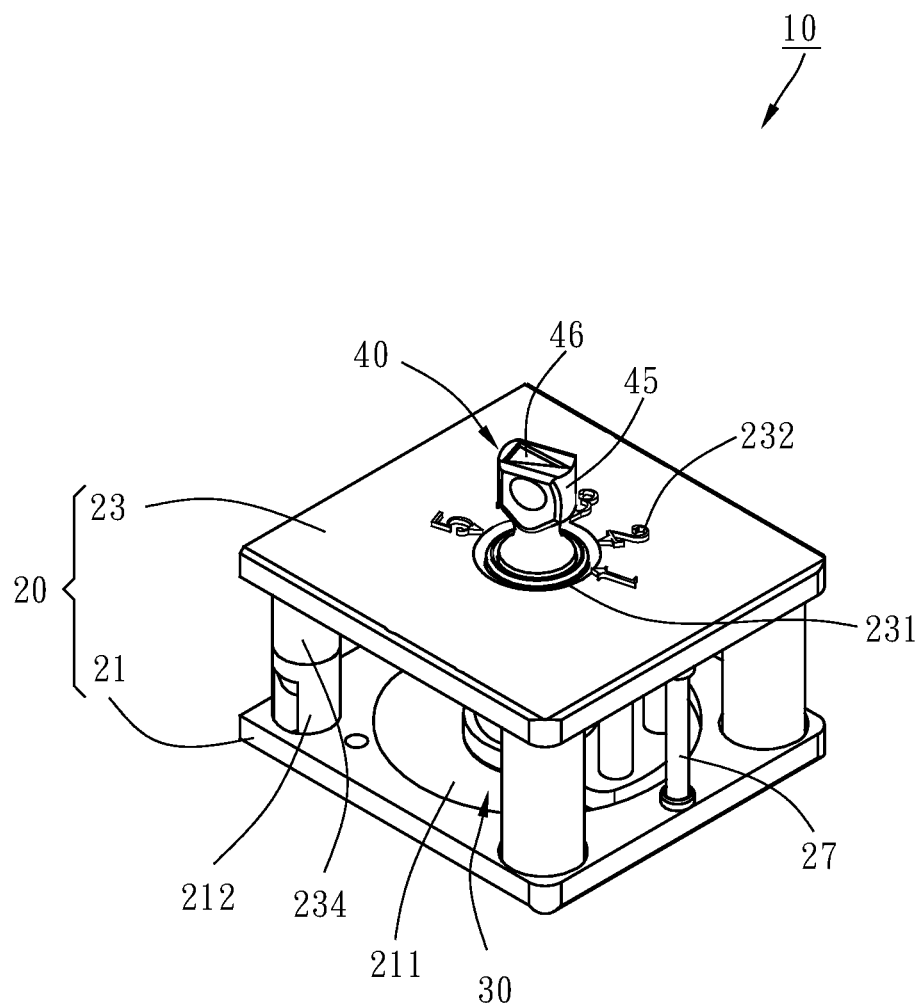
FIG. 1 is an assembled perspective view of a resistance adjusting device according to a first preferred embodiment of the present invention.
Figure 2:
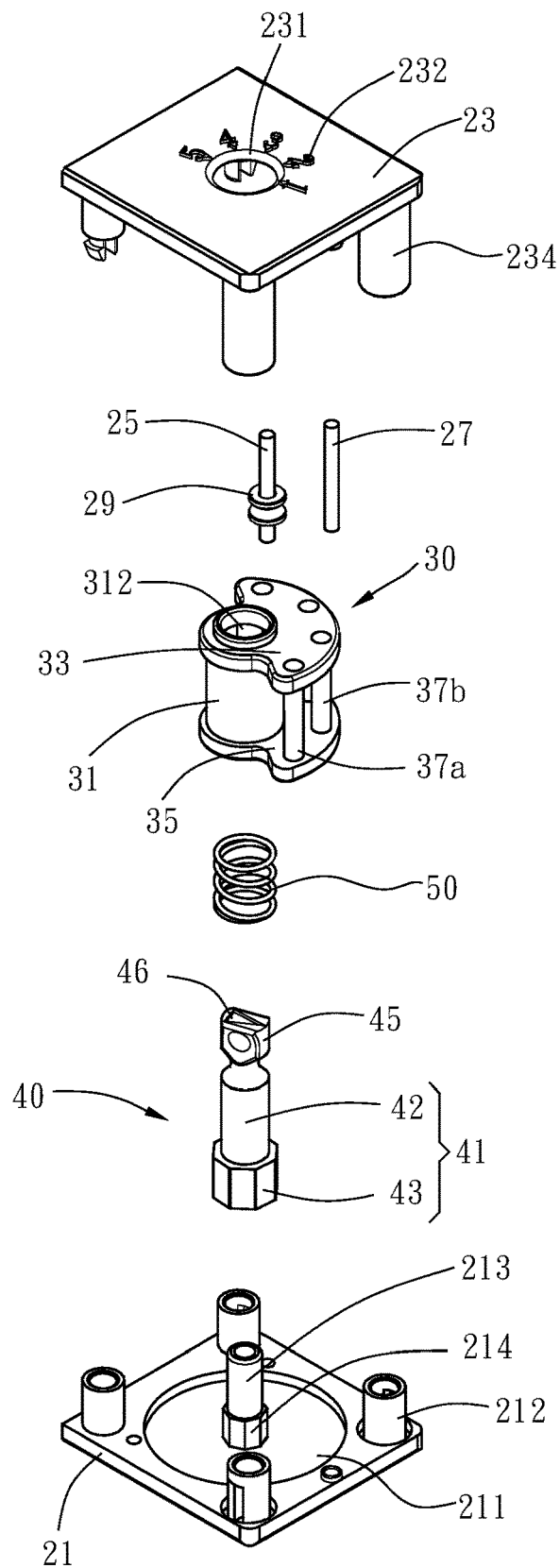
FIG. 2 is an exploded perspective view of the resistance adjusting device according to the first preferred embodiment of the present invention.

Referring to FIGS. 1-2, a resistance adjusting device 10 according to a first preferred embodiment of the present invention includes a base 20, a resistance adjusting seat 30, a control pin 40, and an elastic member 50.

Figure 3:
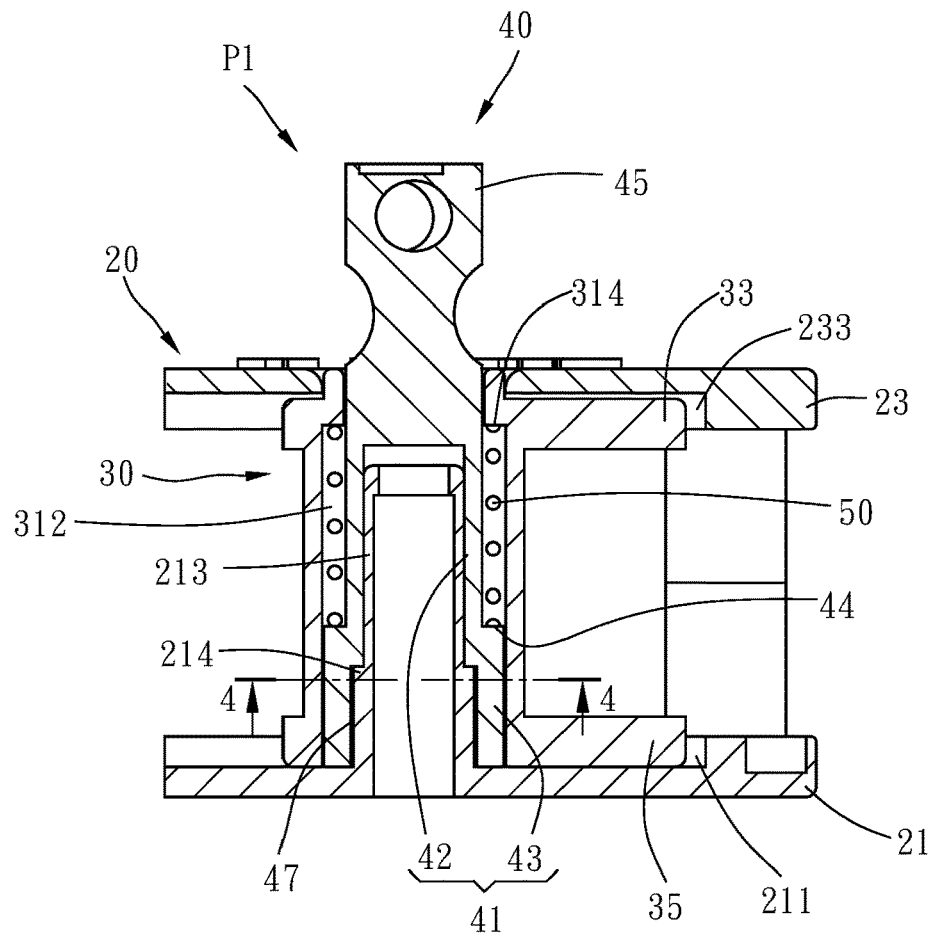
FIG. 3 is a sectional view of the resistance adjusting device according to the first preferred embodiment of the present invention, primarily showing a control pin is located at a positioning position.

The base 20 has a bottom plate 21 and a top plate 23. As shown in FIG. 2, the bottom plate 21 is provided on the top surface thereof with a bottom accommodating recess 211 and four bottom peripheral posts 212 located around the bottom accommodating recess 211. Besides, the bottom plate 21 is provided at the center thereof with a fixed shaft 213 and a first positioning portion 214. The bottom end of the fixed shaft 213 is located adjacent to the top end of the first positioning portion 214. The fixed shaft 213 has circular cross-sections, and the first positioning portion 214 has octagonal cross-sections. The top plate 23 is provided at the center thereof with a top hole 231 opened on the top and bottom surfaces of the top plate 23. The top plate 23 is provided on the top surface thereof with five Arabic numeral state marks 232 located around the top hole 231. As shown in FIGS. 2-3, the top plate 23 is provided on the bottom surface thereof with a top accommodating recess 233 and four top peripheral posts 234 located around the top accommodating recess 233. The top plate 23 and the bottom plate 21 are combined together by means of the top and bottom peripheral posts 234 and 212 corresponding to each other vertically, so that the fixed shaft 213 of the bottom plate 21 is correspondingly located under the top hole 231 of the top plate 23. Besides, the base 20 is provided at left and right ends thereof with a first tension guiding rod 25 and a second tension guiding rod 27 respectively. The first and second tension guiding rods 25 and 27 are connected between the top and bottom plates 23 and 21. There is a guiding wheel 29 sleeved onto the first tension guiding rod 25.

Figure 4:
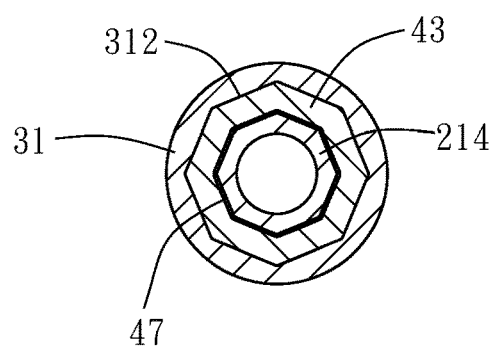
FIG. 4 is a sectional view taken along the line 4-4 in FIG. 3, primarily showing a second positioning portion of a driving portion of the control pin is engaged with a first positioning portion of a base.
Figure 9:
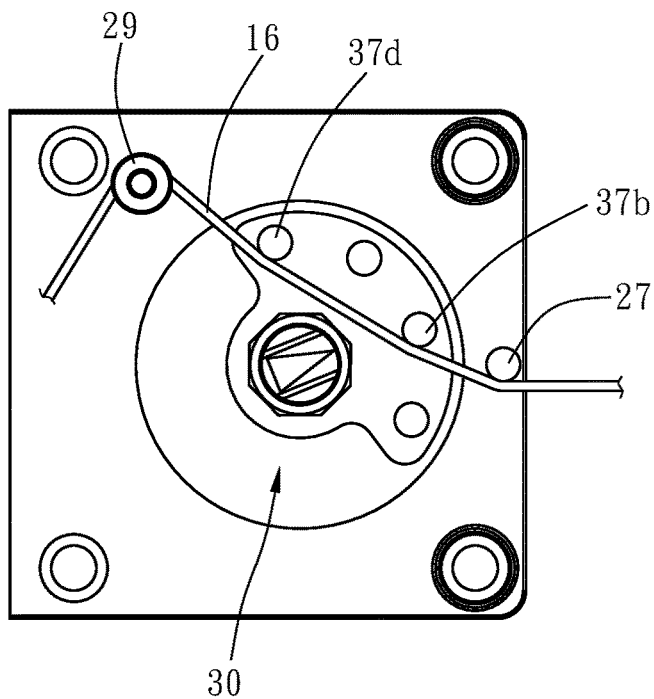
FIGS. 9-12 are sectional views of the resistance adjusting device according to the first preferred embodiment of the present invention, primarily showing the various cord arrangements of the lift transmission cord in the various states of the resistance adjusting seat.

As shown in FIGS. 2-4, the resistance adjusting seat 30 is disposed between the top and bottom plates 23 and 21 of the base 20, and has a transmission shaft 31, a top flank plate 33, a bottom flank plate 35 and four resistance adjusting rods 37a-37d. The transmission shaft 31 has a transmission hole 312 which is octagon-shaped in cross-sections. The transmission hole 312 is provided at the top end of the inner wall thereof with an inner shoulder portion 314. Besides, the radius of the transmission hole 312 is larger than the external radius of the fixed shaft 213 of the base 20, so that the resistance adjusting seat 30 is rotatable relative to the base 20 after being sleeved onto the fixed shaft 213 of the base 20 by means of the transmission hole 312 of the transmission shaft 31. The top and bottom flank plates 33 and 35 are connected to the top and bottom ends of the transmission shaft 31 and rotatably accommodated in the top and bottom accommodating recesses 233 and 211 respectively. As shown in FIGS. 2 and 9, the resistance adjusting rods 37a-37d are disposed between the top and bottom flank plates 33 and 35, arranged at intervals, and archedly center around a center of the transmission hole 312 of the transmission shaft 31.

Figure 5:
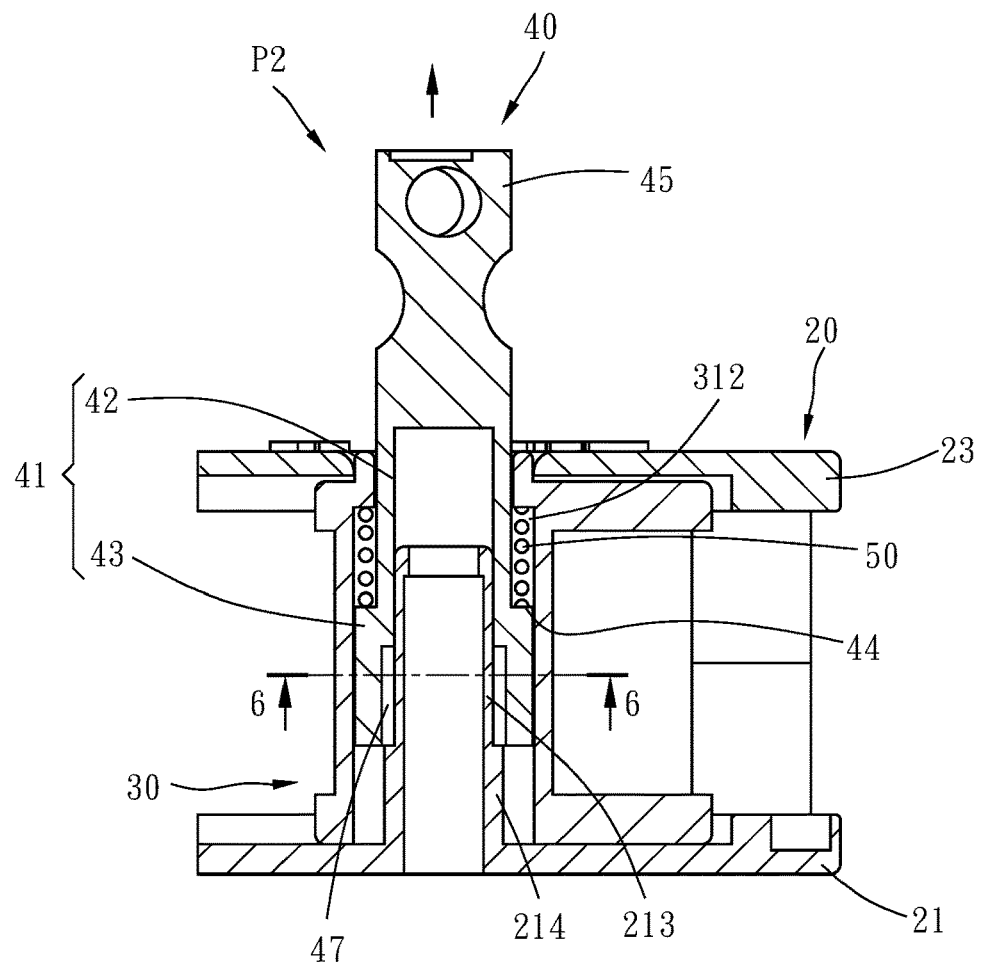
FIG. 5 is a sectional view of the resistance adjusting device according to the first preferred embodiment of the present invention, primarily showing the control pin is located at an adjustment position.
Figure 6:
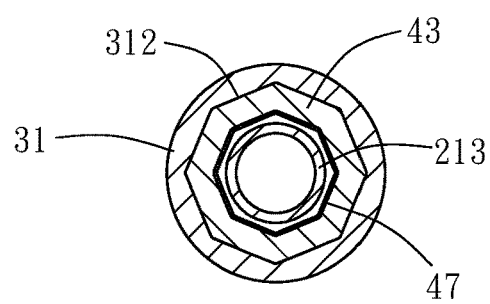
FIG. 6 is a sectional view taken along the line 6-6 in FIG. 5, primarily showing the second positioning portion of the driving portion of the control pin is separated from the first positioning portion of the base, and the driving portion of the driving shaft of the control pin is embedded in a transmission hole of a transmission shaft of a resistance adjusting seat.

The control pin 40 has a driving shaft 41. The driving shaft 41 has an axial portion 42 which is circular in cross-sections, and a driving portion 43 which is octagon-shaped in cross-sections. The bottom end of the axial portion 42 is connected to the top end of the driving portion 43, so that an outer shoulder portion 44 is formed therebetween, as shown in FIG. 3. Besides, as shown in FIG. 4, the driving shaft 41 is provided at the bottom end thereof with a polygonal hole which forms a second positioning portion 47. The control pin 40 is sleeved onto the fixed shaft 213 of the base 20 by the polygonal hole of the driving shaft 41, i.e. the second positioning portion 47. When the control pin 40 is located at a positioning position P1 as shown in FIG. 3, the second positioning portion 47 of the driving shaft 41 of the control pin 40 is engaged with the first positioning portion 214 of the base 20. Because the first and second positioning portions 214 and 47 are both polygon-shaped in cross-sections, as shown in FIG. 4, the control pin 40 is unable to rotate relative to the base 20. In opposite, when the control pin 40 is located at an adjustment position P2 as shown in FIG. 5, the second positioning portion 47 of the driving shaft 41 of the control pin 40 is separated from the first positioning portion 214 of the base 20, and the driving portion 43 of the driving shaft 41 of the control pin 40 is engaged with the transmission hole 312 of the transmission shaft 31 of the resistance adjusting seat 30. Because the driving portion 43 and the transmission hole 312 are both polygon-shaped in cross-sections as shown in FIG. 6, the control pin 40 at this time can drive the resistance adjusting seat 30 to rotate together.

As shown in FIGS. 1, 2 and 4, the control pin 40 further has an operating portion 45 which is connected to the top end of the axial portion 42 of the driving shaft 41 and protruded from the top surface of the top plate 23 of the base 20 through the top hole 231 of the top plate 23 of the base 20. The operating portion 45 is provided at the top end thereof with an indicating symbol 46, such as the arrow shown in the FIGS. 1 and 2. Through the rotation of the control pin 40, the indicating symbol 46 corresponds to one of the state marks 232 of the top plate 23 of the base 20.

The elastic member 50 is sleeved onto the axial portion 42 of the driving shaft 41 of the control pin 40, and abutted between the inner shoulder portion 314 of the transmission shaft 31 of the resistance adjusting seat 30 and the outer shoulder portion 44 of the control pin 40, for providing elastic force to keep the control pin 40 located at the positioning position P1 as shown in FIG. 3.

Figure 7:
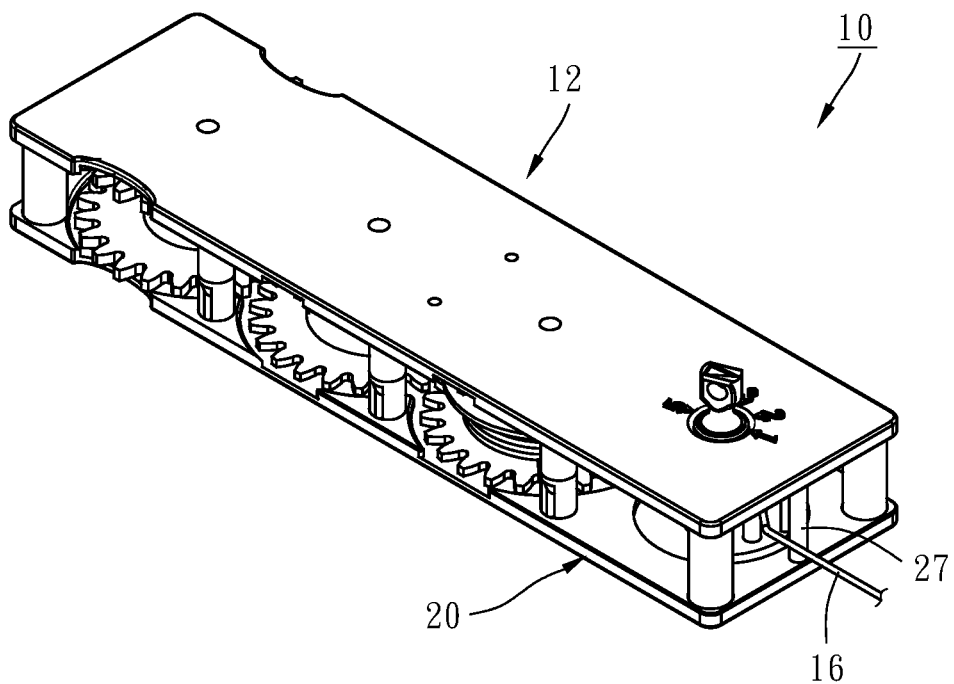
FIG. 7 is an assembled perspective view of the resistance adjusting device according to the first preferred embodiment of the present invention and a single-torsion-spring cord rolling device used with it.
Figure 8:
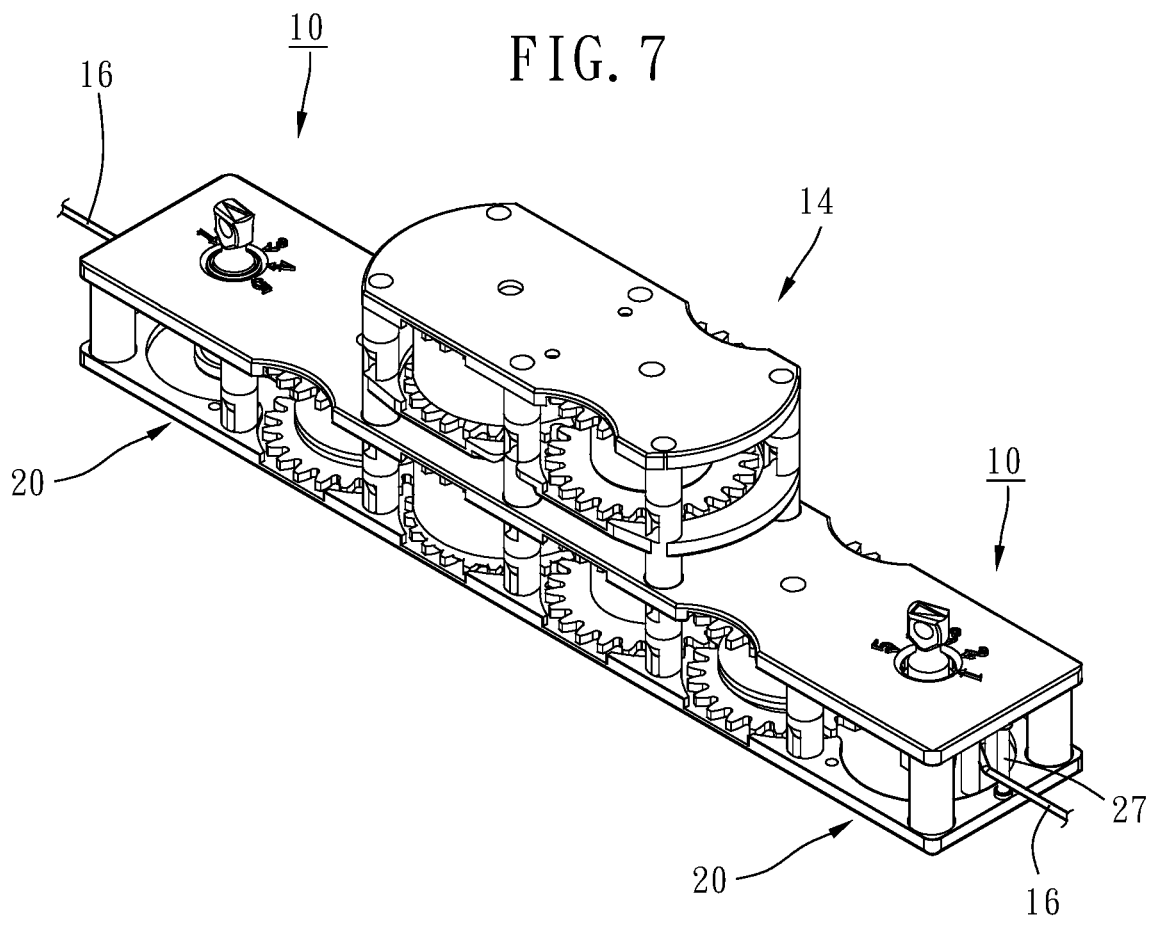
FIG. 8 is an assembled perspective view of the resistance adjusting device according to the first preferred embodiment of the present invention and a dual-torsion-spring cord rolling device used with it.

In practical usage, different types of cord rolling devices can use different amounts of the resistance adjusting device 10 of the invention. For example, for the single-torsion-spring cord rolling device 12 as shown in FIG. 7, because there is only one lift transmission cord 16, there may be only one resistance adjusting device 10 of the invention disposed in the single-torsion-spring cord rolling device 12. For the dual-torsion-spring cord rolling device 14 as shown in FIG. 8, because there are two lift transmission cords 16 at the left and right sides, there should be two resistance adjusting devices 10 of the invention disposed in the cord rolling device 14. However, no matter used with which type of cord rolling device 12 or 14, the resistance adjusting device 10 of the invention is combined with the aforesaid cord rolling device 12 or 14 by the base 20, and the lift transmission cord 16 is wound around the guiding wheel 29 and the second tension guiding rod 27 and then extended out of the base 20, as shown in FIGS. 9-12.

Figure 10:
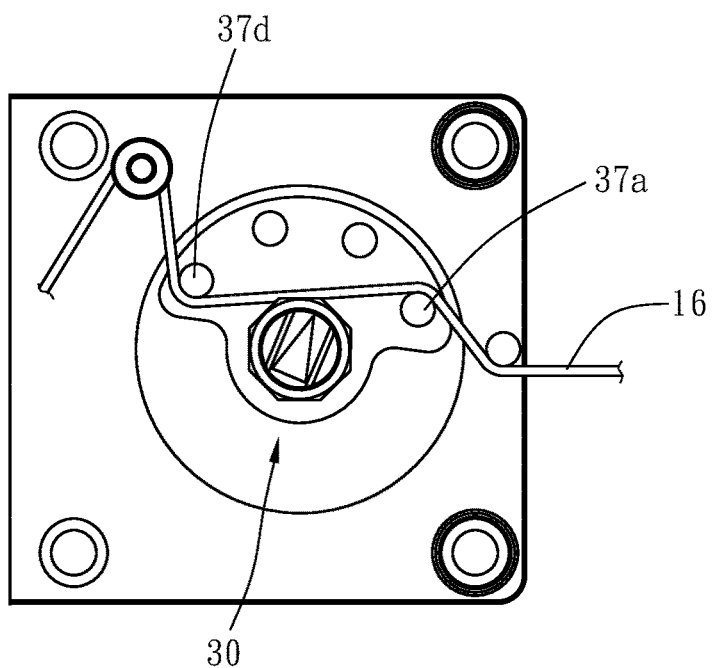
Figure 11:
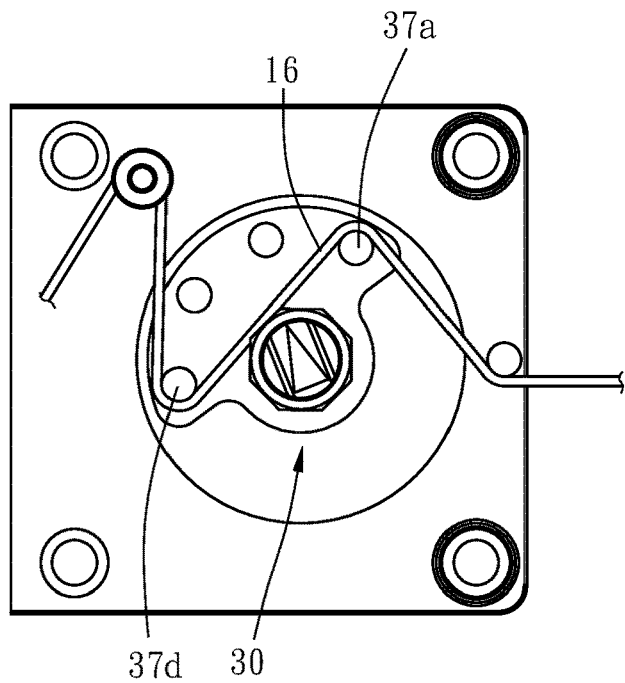
Figure 12:
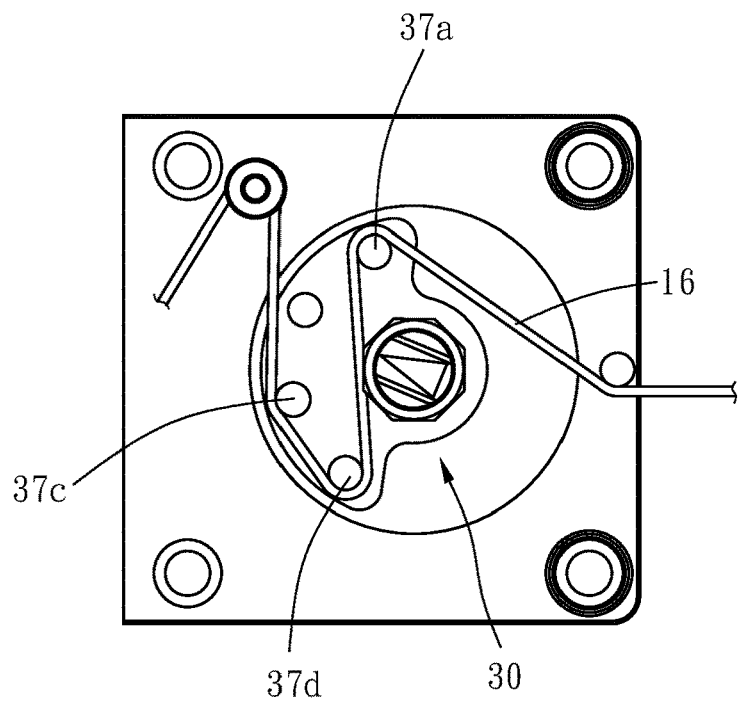

For the adjustment of the friction resistance between the lift transmission cord 16 and the resistance adjusting seat 30, the operating portion 45 of the control pin 40 is firstly used to let the control pin 40 be pulled up from the positioning position P1 as shown in FIG. 3 to the adjustment position P2 as shown in FIG. 5, so that the second positioning portion 47 of the driving shaft 41 of the control pin 40 is separated from the first positioning portion 214 of the base 20. At this time, the elastic member 50 is compressed by the outer shoulder portion 44 of the control pin 40 to save the resilient force. After that, the control pin 40 can be rotated. During the rotation of the control pin 40, the driving portion 43 of the driving shaft 41 of the control pin 40 is kept engaged with the transmission hole 312 of the transmission shaft 31 of the resistance adjusting seat 30, so the resistance adjusting seat 30 rotates together with the control pin 40 and changes the friction resistance applied to the lift transmission cord 16 by one or a plurality of the resistance adjusting rods 37a-37d during the rotation. For example, when the resistance adjusting seat 30 is located at a first state as shown in FIG. 9, the resistance adjusting seat 30 is abutted against the lift transmission cord 16 by the leftest resistance adjusting rod 37d and the second resistance adjusting rod 37b from the right side. When the resistance adjusting seat 30 is rotated to a second state as shown in FIG. 10 or a third state as shown in FIG. 11, the resistance adjusting seat 30 presses the lift transmission cord 16 by the leftest resistance adjusting rod 37d and pushes the lift transmission cord 16 by the rightest resistance adjusting rod 37a. When the resistance adjusting seat 30 is further rotated to a fourth state as shown in FIG. 12, the resistance adjusting seat 30 presses the lift transmission cord 16 by the left two resistance adjusting rods 37c-37d and pushes the lift transmission cord 16 by the rightest resistance adjusting rod 37a.

During the aforesaid adjustment, the user can control the magnitude of the resistance by means of the indicating symbol 46 of the control pin 40 and the state marks 232 of the base 20. The larger number the state mark 232 shows, the larger angle the control pin 40 drives the resistance adjusting seat 30 to rotate and the larger resistance the lift transmission cord 16 is applied with.

When the adjustment is finished, as long as the pull force applied on the control pin 40 is relieved, the control pin 40 will be moved back to the positioning position P1 as shown in FIG. 3 by the resilient force of the elastic member 50, so that the second positioning portion 47 of the driving shaft 41 of the control pin 40 is engaged with the first positioning portion 214 of the base 20. At this time, the control pin 40 is unable to be rotated, so the resistance adjusting seat 30 is also unable to rotate together.

On the other hand, in the second preferred embodiment of the present invention, the control pin 70 is operated by being pushed down, that is different from the pulled-up operation in the aforesaid embodiment. For the operation of the control pin 70, the first positioning portion 66, the second positioning portion 73 and the elastic member 50 should be modified in position. The other structure is approximately the same with the aforesaid embodiment.

Figure 13:
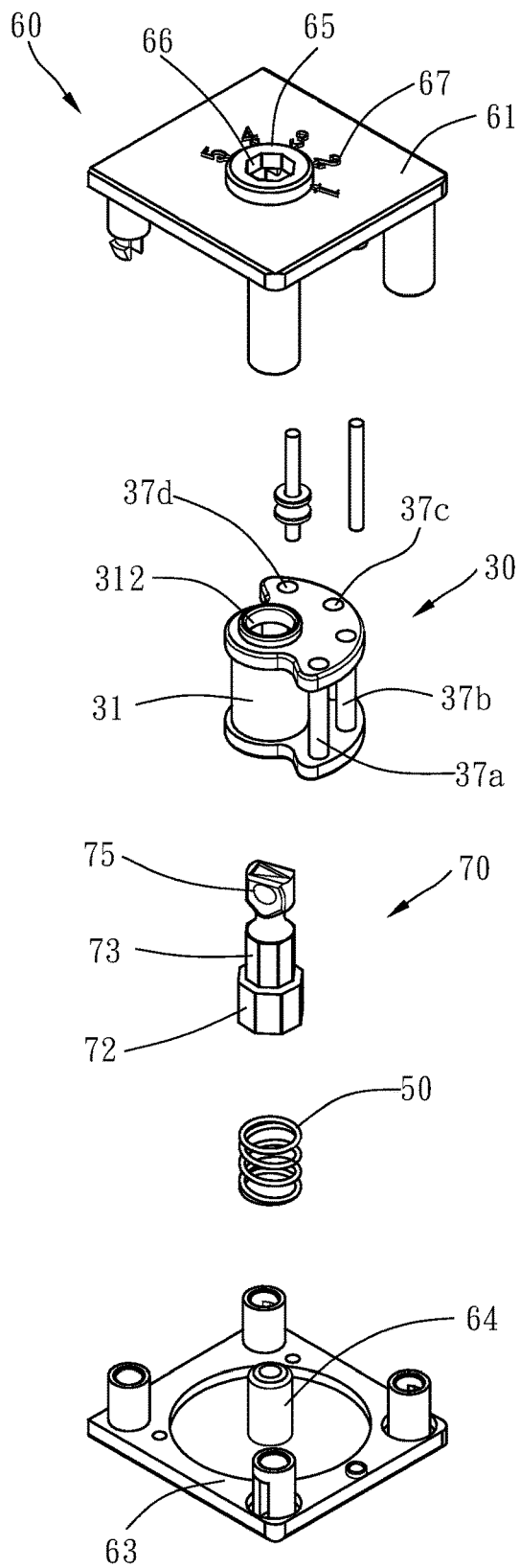
FIG. 13 is an exploded perspective view of a resistance adjusting device according to a second preferred embodiment of the present invention.

Referring to FIG. 13, the base 60 further has a protruded edge 65. The protruded edge 65 is provided around the top hole 62 of the top plate 61 and provided with an octagonal hole communicating with the top hole 62 coaxially. The aforesaid octagonal hole forms the first positioning portion 66. The bottom end of the fixed shaft 64 is directly connected to the top surface of the bottom plate 63. The state marks 67 are provided around the protruded edge 65.

Figure 17:
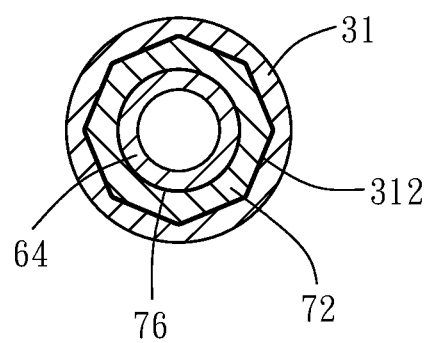
FIG. 17 is a sectional view taken along the line 17-17 in FIG. 16, primarily showing the driving portion of the driving shaft of the control pin is embedded in a transmission hole of a transmission shaft of a resistance adjusting seat.

The second positioning portion 73 of the control pin 70 is located adjacent to the top end of the driving portion 72. The second positioning portion 73 has octagonal cross-sections. The external radius of the second positioning portion 73 is smaller than the external radius of the driving portion 72, so that an outer shoulder portion 74 is formed therebetween. The operating portion 75 of the control pin 70 is located adjacent to the top end of the second positioning portion 73 and protruded from the top surface of the base 60 through the top hole 62 of the top plate 61 and the octagonal hole (i.e. the first positioning portion 66) of the protruded edge 65. Besides, the driving shaft 71 of the control pin 70 is provided at the bottom end thereof with a sleeve hole 76, as shown in FIG. 17. The sleeve hole 76 has circular cross-sections. The control pin 70 is sleeved onto the fixed shaft 64 of the base 60 by the sleeve hole 76. Because the fixed shaft 64 and the sleeve hole 76 are both circular in cross-sections, the control pin 70 is rotatable relative to the base 60.

Figure 14:
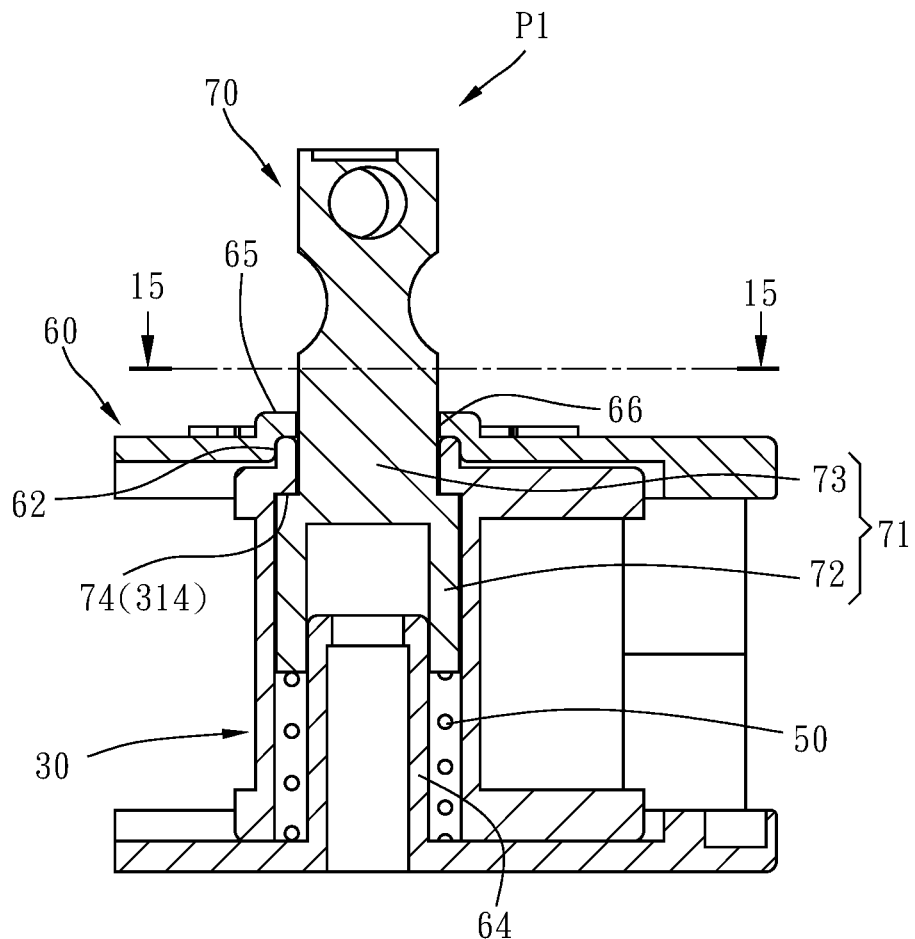
FIG. 14 is a sectional view of the resistance adjusting device according to the second preferred embodiment of the present invention, primarily showing a control pin is located at a positioning position.
Figure 15:
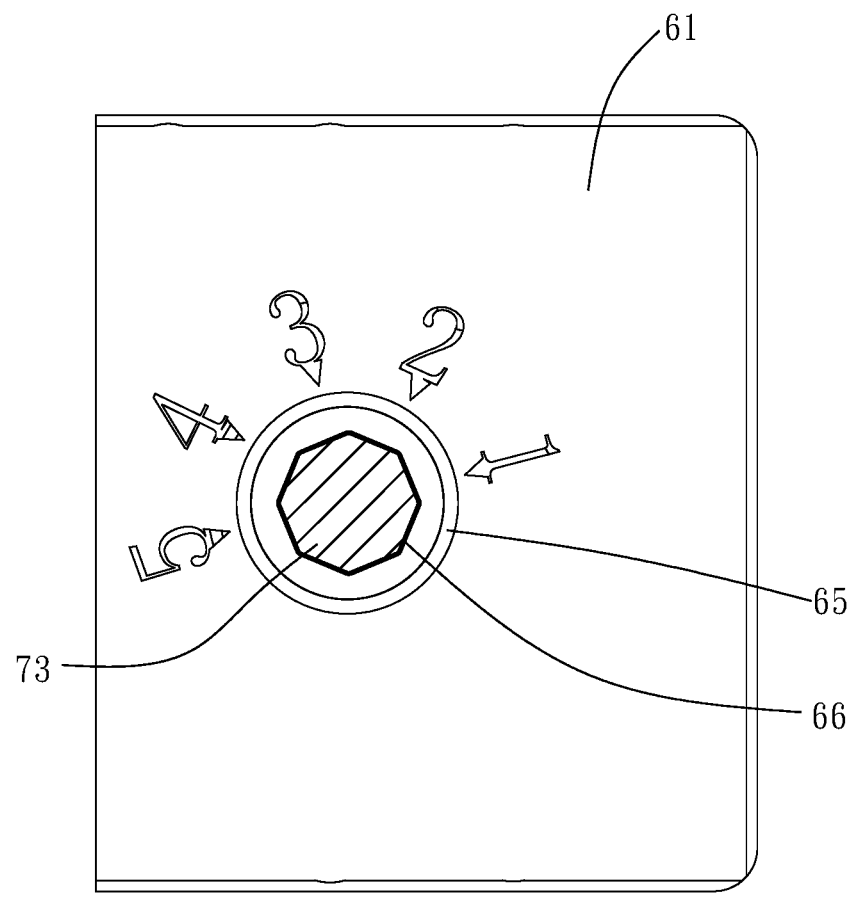
FIG. 15 is a sectional view taken along the line 15-15 in FIG. 14, primarily showing a second positioning portion of a driving portion of the control pin is engaged with a first positioning portion of a base.
Figure 16:
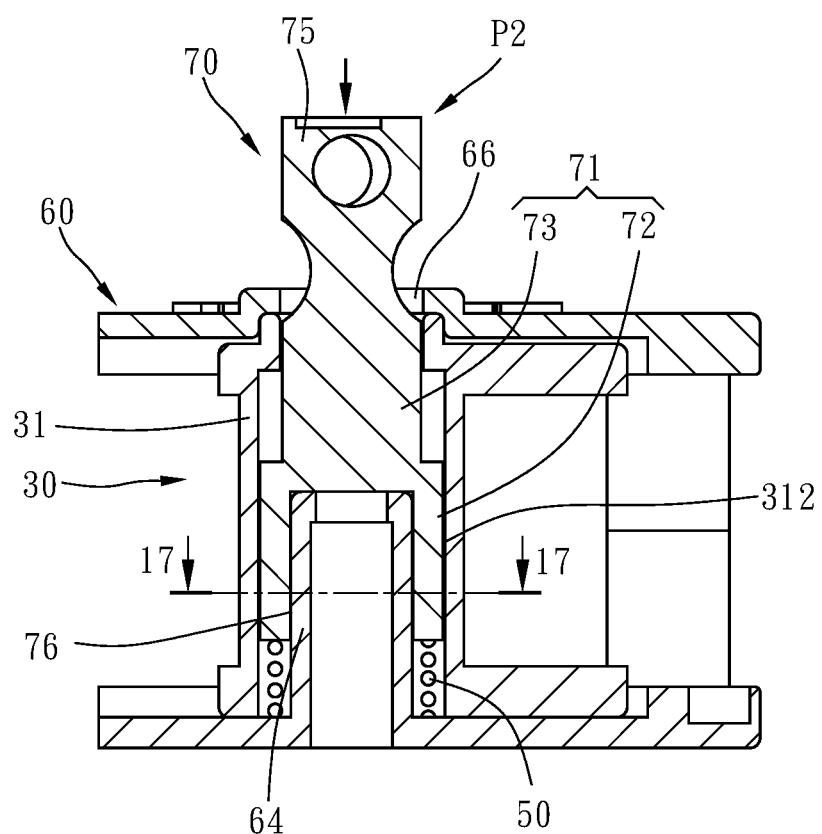
FIG. 16 is a sectional view of the resistance adjusting device according to the second preferred embodiment of the present invention, primarily showing the control pin is located at an adjustment position.

As a result, when the control pin 70 is located at the positioning position P1 as shown in FIG. 14, the pushing force of the elastic member 50 makes the second positioning portion 73 of the driving shaft 71 of the control pin 70 engaged with the first positioning portion 66 of the base 60. Because the first and second positioning portions are both polygon-shaped in cross-sections as shown in FIG. 15, the control pin 70 is unable to rotate relative to the base 60. Besides, when the control pin 70 is located at the positioning position P1, the outer shoulder portion 74 of the control pin 70 is abutted against the inner shoulder portion 314 of the transmission shaft 31 of the resistance adjusting seat 30, so that the position of the control pin 70 is limited. In opposite, when the control pin 70 is located at the adjustment position P2 as shown in FIG. 16, the second positioning portion 73 of the driving shaft 71 of the control pin 70 is separated from the first positioning portion 66 of the base 60 and the driving portion 72 of the driving shaft 71 of the control pin 70 is engaged with the transmission hole 312 of the transmission shaft 31 of the resistance adjusting seat 30. Because the driving portion 72 and the transmission hole 312 are both polygon-shaped in cross-sections, the control pin 70 at this time is able to drive the resistance adjusting seat 30 to rotate together.

The elastic member 50 is sleeved onto the fixed shaft 64 of the base 60 and abutted between the top surface of the bottom plate 63 of the base 60 and the bottom end of the driving portion 72 of the control pin 70 for keeping the control pin 70 located at the positioning position P1 as shown in FIG. 14.

It can be understood from the above illustration that in practical operation, the operating portion 75 of the control pin 70 is firstly used to let the control pin 70 be pushed down from the positioning position P1 as shown in FIG. 14 to the adjustment position P2 as shown in FIG. 16, so that the second positioning portion 73 of the driving shaft 71 of the control pin 70 is separated from the first positioning portion 66 of the base 60. At this time, the elastic member 50 is compressed by the driving portion 72 of the control pin 70 to save the resilient force. After that, the control pin 70 can be rotated. During the rotation of the control pin 70, the driving portion 72 of the driving shaft 71 of the control pin 70 is kept engaged with the transmission hole 312 of the transmission shaft 31 of the resistance adjusting seat 30, so the resistance adjusting seat 30 rotates together with the control pin 70 and changes the cord arrangement of the lift transmission cord 16 by one or a plurality of the resistance adjusting rods 37a-37d during the rotation, as shown in FIGS. 9-12, thereby adjusting the friction resistance.

When the adjustment is finished, as long as the push force applied on the control pin 70 is relieved, the control pin 70 will be moved back to the positioning position P1 as shown in FIG. 14 by the resilient force of the elastic member 50, so that the second positioning portion 73 of the driving shaft 71 of the control pin 70 is engaged with the first positioning portion 66 of the base 60. At this time, the control pin 70 is unable to be rotated, so the resistance adjusting seat 30 is also unable to rotate together.

Figure 18:
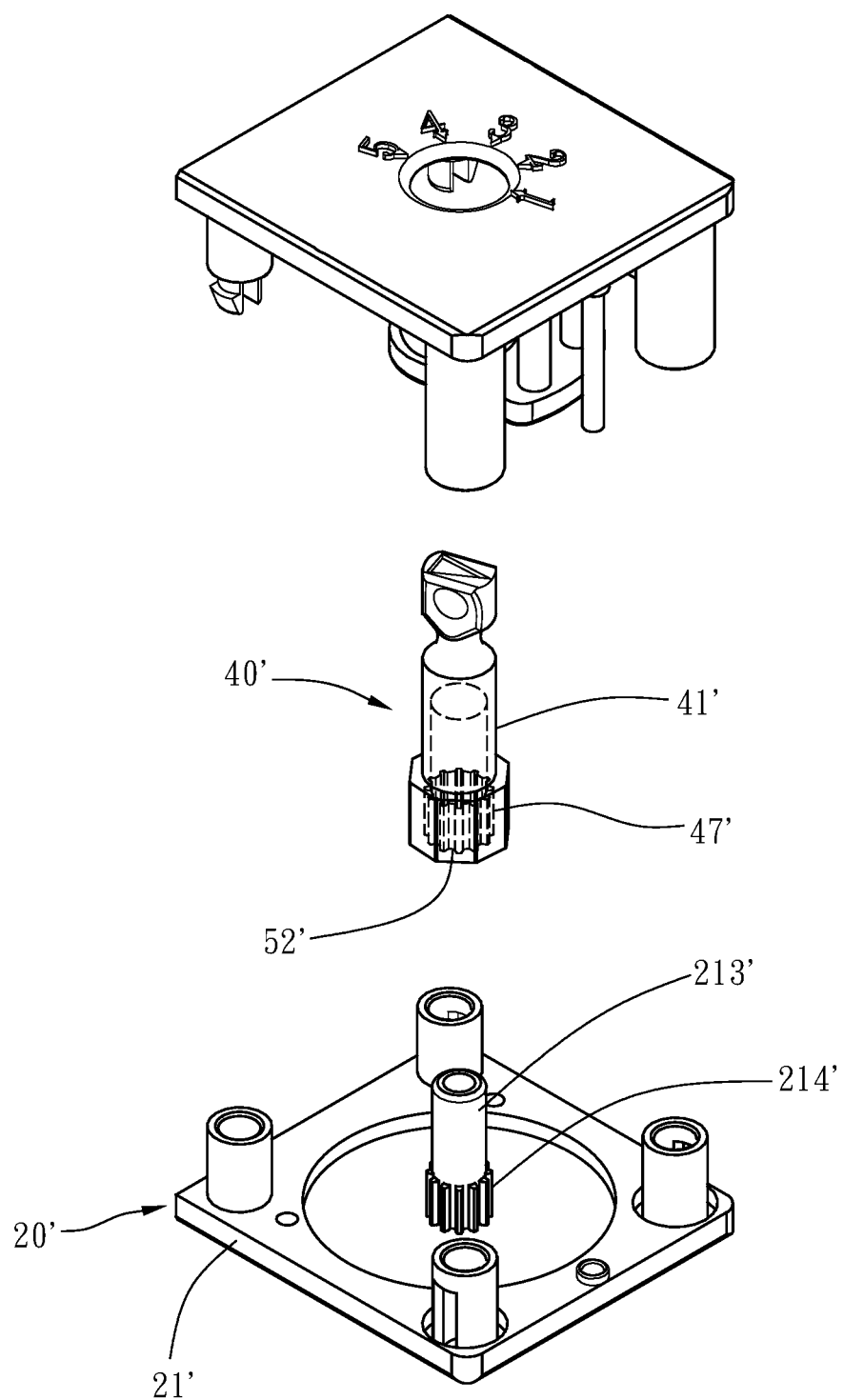
FIG. 18 is an exploded perspective view of the resistance adjusting device according to the third preferred embodiment of the present invention.

Referring to FIG. 18, in the third preferred embodiment of the present invention, the first positioning portion 214' of the bottom plate 21' of the base 20' has outer ratchet teeth. The second positioning portion 47' of the driving shaft 41' of the control pin 40' has a sleeve space 52' at the bottom end of the driving shaft 41'. The sleeve space 52' has an inner wall formed with inner ratchet teeth corresponding to the outer ratchet teeth of the first positioning portion 214' of the bottom plate 21'. The control pin 40' is sleeved onto the fixed shaft 213' of the base 20' by the sleeve space 52' of the driving shaft 41'. The other structure is approximately the same with the first preferred embodiment.

In conclusion, the resistance adjusting device 10 of the invention can be used to adjust the friction resistance between the lift transmission cord 16 and the resistance adjusting seat 30 as long as the control pin 40 or 70 is operated to the adjustment position P2. The whole adjusting process needs no structural disassembly and assembly, and the magnitude of the resistance can be accurately controlled by means of the cooperation of the indicating symbol 46 and the state marks 232, so that the usage convenience is increased and the assembly accuracy can be maintained.

What is claimed is:

1. A resistance adjusting device for a non-pull cord window blind, the resistance adjusting device comprising:
    a base having a top opening, a first positioning portion, and a fixed shaft having a circular cross-sectional contour, wherein the first positioning portion is located adjacent to a bottom end of the fixed shaft; and the first positioning portion having a polygonal cross-sectional contour;
    a resistance adjusting seat disposed on the base and having a transmission shaft and a plurality of resistance adjusting rods, the transmission shaft having a transmission hole having a polygonal cross-sectional contour, the resistance adjusting seat being rotatably sleeved onto the fixed shaft of the base via the transmission hole of the transmission shaft, the plurality of resistance adjusting rods being disposed around the transmission shaft; and
    a control pin having a driving shaft, the control pin being sleeved onto the fixed shaft of the base by the driving shaft, the control pin thereby being displaceable vertically and being rotatable, the driving shaft having a second positioning portion and a driving portion having a polygonal cross-sectional contour, the driving shaft of the control pin being provided at a bottom end thereof with a polygonal hole to form the second positioning portion; the control pin being rotatably sleeved onto the fixed shaft of the base by the polygonal hole; the second positioning portion of the driving shaft of the control pin being engaged with the first positioning portion of the base to thereby disable the control pin from rotating responsive to the control pin being located at a positioning position, the second positioning portion of the driving shaft of the control pin being separated from the first positioning portion of the base and the driving portion of the driving shaft of the control pin being embedded in the transmission hole of the transmission shaft of the resistance adjusting seat to drive the control pin and the resistance adjusting seat to rotate together responsive to the control pin being located at an adjustment position.

2. The resistance adjusting device as claimed in claim 1, wherein the transmission shaft of the resistance adjusting seat is provided at a top end thereof with an inner shoulder portion; the driving shaft of the control pin has an axial portion having a circular cross-sectional contour; the axial portion is located adjacent to the driving portion, and an outer shoulder portion is formed between the axial portion and the driving portion; the resistance adjusting device further has an elastic member which is sleeved onto the axial portion of the driving shaft of the control pin and abutted between the inner and outer shoulder portions for keeping the control pin located at the positioning position.

3. The resistance adjusting device as claimed in claim 2, wherein the control pin further has an operating portion which is connected to a top end of the axial portion of the driving shaft and protruded from a top surface of the base through the top opening of the base.

4. The resistance adjusting device as claimed in claim 3, wherein the top surface of the base is provided with a plurality of state marks located around the top opening; the operating portion of the control pin has an indicating symbol which corresponds to one of the state marks.

5. The resistance adjusting device as claimed in claim 1, wherein the first positioning portion is located adjacent to a bottom end of the fixed shaft; the first positioning portion has outer ratchet teeth; the driving shaft of the control pin is provided at a bottom end thereof with a sleeve space which forms the second positioning portion, the sleeve space has an inner wall formed with inner ratchet teeth corresponding to the outer ratchet teeth; the control pin is rotatably sleeved onto the fixed shaft of the base by the sleeve space.

6. The resistance adjusting device as claimed in claim 5, wherein the transmission shaft of the resistance adjusting seat is provided at a top end thereof with an inner shoulder portion; the driving shaft of the control pin has an axial portion having a circular cross-sectional contour; the axial portion is located adjacent to the driving portion, and an outer shoulder portion is formed between the axial portion and the driving portion; the resistance adjusting device further has an elastic member which is sleeved onto the axial portion of the driving shaft of the control pin and abutted between the inner and outer shoulder portions for keeping the control pin located at the positioning position.

7. The resistance adjusting device as claimed in claim 6, wherein the control pin further has an operating portion which is connected to a top end of the axial portion of the driving shaft and protruded from a top surface of the base through the top opening of the base.

8. The resistance adjusting device as claimed in claim 7, wherein the top surface of the base is provided with a plurality of state marks located around the top opening; the operating portion of the control pin has an indicating symbol which corresponds to one of the state marks.

9. The resistance adjusting device as claimed in claim 1, wherein the resistance adjusting seat further has a top flank plate and a bottom flank plate; the top and bottom flank plates are connected to top and bottom ends of the transmission shaft; the resistance adjusting rods are disposed between the top and bottom flank plates and are arranged in intervals in a curved configuration; and a center of the curve coincides with a center of the transmission hole of the transmission shaft.

10. The resistance adjusting device as claimed in claim 9, wherein the base has a top accommodating recess and a bottom accommodating recess; the top and bottom flank plates of the resistance adjusting seat are, respectively, rotatably accommodated in the top and bottom accommodating recesses.

11. The resistance adjusting device as claimed in claim 1, wherein the base is provided at two opposite ends thereof with a first tension guiding rod and a second tension guiding rod, respectively; the base further has a guiding wheel disposed on the first tension guiding rod.

\* \* \* \* \*